United States Patent [19]
Lehmann

[11] B 3,925,240
[45] Dec. 9, 1975

[54] HALOGEN CONTAINING LEAD ACTIVATED CALCIUM SULFIDE LUMINESCENT COMPOSITION

[75] Inventor: Willi Lehmann, Murrysville, Pa.

[73] Assignee: Westinghouse Electric Corporation, Pittsburgh, Pa.

[22] Filed: Oct. 18, 1973

[21] Appl. No.: 407,728

[44] Published under the Trial Voluntary Protest Program on January 28, 1975 as document no. B 407,728.

Related U.S. Application Data

[63] Continuation-in-part of Ser. No. 876,766, Nov. 14, 1969, abandoned.

[30] Foreign Application Priority Data

Oct. 26, 1970 Japan............................ 45-93590

[52] U.S. Cl. ....................................... 252/301.4 S
[51] Int. Cl.$^2$ ......................................... C09k 11/34
[58] Field of Search.............................. 252/301.4 S

[56] References Cited
UNITED STATES PATENTS
3,673,102  6/1972  Lehmann et al............. 252/301.4 S

FOREIGN PATENTS OR APPLICATIONS
650,458  2/1951  United Kingdom.......... 252/301.4 S

OTHER PUBLICATIONS
Lenard et al., "Handbuch Der Experimental Physik," .1 Teil, 1928, pp. 342–345.

*Primary Examiner*—Jack Cooper
*Attorney, Agent, or Firm*—W. D. Palmer

[57] ABSTRACT

An ultraviolet emitting, cathodoluminescent, halogen and lead activated calcium sulfide composition emits as a narrow band with a peak at about 365 nanometers, under cathode ray excitation, with an increased efficiency of cathodoluminescence over the presently used oxygen dominated phosphors which emit in this region. A preferred method of preparation is set forth in which the lead and halogen are added to calcium sulfide which is fired to produce the phosphor.

4 Claims, 2 Drawing Figures

3,925,240

HALOGEN CONTAINING LEAD ACTIVATED CALCIUM SULFIDE LUMINESCENT COMPOSITION

CROSS REFERENCE TO A RELATED APPLICATION

This invention is a continuation-in-part of copending application Ser. No. 876,766, filed Nov. 14, 1969 now abandoned and entitled "Halogen Containing Lead Activated Calcium Sulfide Luminescent Composition."

BACKGROUND OF THE INVENTION

The cathodoluminescent composition of lead activated calcium sulfide has been described in the literature, and is described as emitting with an emission band in the green, blue, violet or ultraviolet. The use of sulfate, borate and halide fluxes has also been described in the literature in preparing a variety of calcium sulfide luminescent compositions, although the use of halide with lead in calcium sulfide is not described. The most recent publication describing lead activated calcium sulfide phosphors does not teach halide in this phosphor (O. Sorge, Thesis presented at Technical Union of Berling, 1959).

Fast decay cathodoluminescent phosphors with emission in the near-ultraviolet are primarily used for flying spot scanners and similar cathode ray tube applications. The cerium-activated calcium-magnesium silicate phosphor, referred to hereinafter as P–16 which is the Radio Manufacturer Association designation, has remained the standard phosphor for flying spot scanners for some years now. This phosphor exhibits a broad band emission peaking at about 380 nanometers, but extending from about 300–475 nanometers. The P–16 phosphor is subject to permanent damage under intense electron bombardment.

SUMMARY OF THE INVENTION

It is an object of the invention to prepare a cathodoluminescent phosphor which emits as a narrow band in the region of 300 to 400 nanometers with a high efficiency.

It is a further object of the invention to provide an efficient cathodoluminescent phosphor which is resistant to electron bombardment damage.

It has been discovered that by incorporating chlorine, bromine or iodine in a lead activated calcium sulfide composition that this composition exhibits a fast decay and is a very efficient cathodoluminescent phosphor emitter in a single narrow band in the near ultraviolet with a peak near 365 nanometers. It has also been discovered that, for maximum ultraviolet emission that the phosphor should be substantially free from alkali metal.

DESCRIPTION OF THE PREFERRED EMBODIMENTS

The phosphor is preferably prepared by adding to about 1 mol of calcium sulfide, $10^{-4}$ gram mol of lead sulfide, and $10^{-2}$ gram mol of calcium chloride. This raw mix after being thoroughly mixed is fired in an inert or sulfurizing atmosphere at about 1,200°C for about 1 hour to render the composition cathodoluminescent. The firing temperature and time are not critical but are preferably carried out at from 1,100°–1,300°C with the lower the temperature the longer the firing time. A portion of the chlorine in the raw mix is incorporated into the final phosphor composition, in the preferred embodiment about $10^{-3}$ gram-atom of chlorine per mol of calcium sulfide is incorporated.

Figure 1:
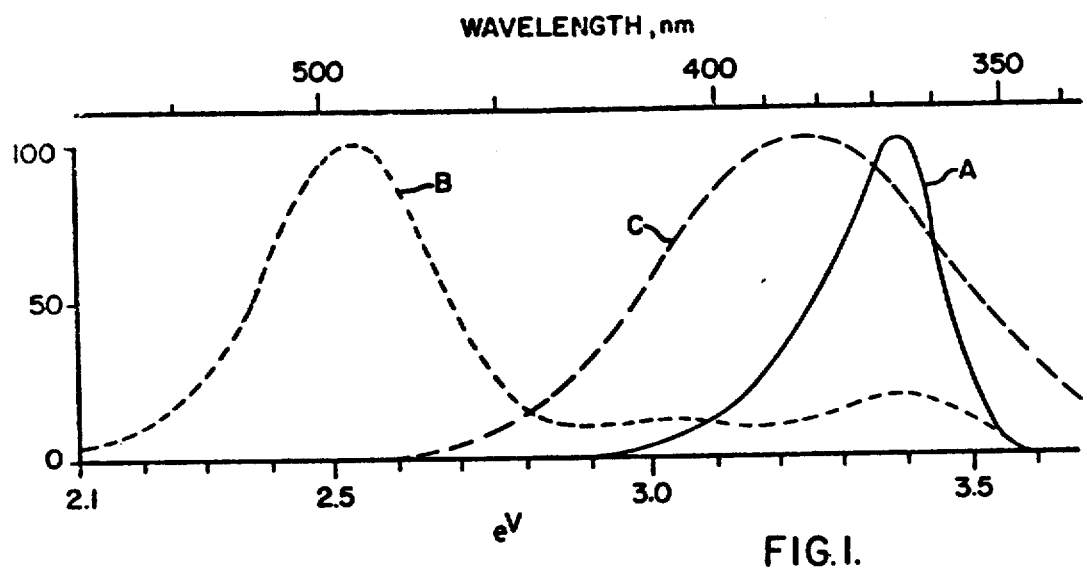
FIG. 1 is a comparison of the emission characteristic of the cathodoluminescent phosphor of the present invention, curve A, as compared to the P–16 phosphor curve C, under equivalent cathode ray excitation, and also to the lead activated calcium sulfide phosphor which does not include the halide, curve B. The emission intensity is here normalized so that peak heights are assigned a value of 100; the absolute peak intensities are of course not equal.

A comparison of the emission spectra of cathodoluminescent phosphors is shown in FIG. 1 where all phosphors were excited by an electron beam of 10 kilovolts and about 1 microamp per square centimeter current density. It can be seen that the phosphor of this invention composition emits as a single narrow emission band in the near ultraviolet with the peak at about 365 nanometers and a half width of about 20 nanometers, in comparison to the prior art calcium sulfide lead activated composition which does not contain halogen and whose emission characteristic under the same cathodoluminescent excitation is designated curve B in the figure. The emission of the standard P–16 phosphor under the same excitation is plotted as curve C in the figure and is to be contrasted and compared with curve A representing the emission of the phosphor of the present invention. The emission of the lead and chlorine activated calcium sulfide phosphor of the present invention exceeds the emission of the P–16 phosphor by a factor of about 2.8 if the entire emission spectrum is measured, and by a factor of about 3.5 is only that portion of the emission spectrum in the near ultraviolet which is effectively utilized is analyzed. A higher proportion of the P–16 emission energy falls in the region which is in effect unusable for the application to which the phosphor is generally applied. Thus, it can be said that since the energy efficiency of the cathodoluminescent P–16 phosphor is about 5 percent, then the efficiency of the phosphor preferred embodiment of the invention is about 14 percent.

The amount of lead activator in the phosphor of the present invention can be readily varied to provide an atomic ratio of lead to sulfur of from about $10^{-5}$ to $10^{-3}$, which thus provides an activating proportion of lead of from about $10^{-5}$ to $10^{-3}$ gram-atom of lead per mol of sulfide.

While in the preferred embodiment the lead was added to the composition as lead sulfide other lead containing compounds can be utilized, such as lead acetate, lead nitrate.

It has been discovered by chemical analysis that the halogen is incorporated into the phosphor. For example, when about $10^{-2}$ gram mol of calcium chloride is added in a raw mix containing about 1 mol of calcium sulfide and $10^{-4}$ and gram-atom of lead are fired, only about $10^{-3}$ gram-atom of chlorine per mol of calcium sulfide is effectively incorporated into the preferred composition, which means a 10:1 atom ratio of halogen to lead. The remaining halogen is either volatilized away during the firing or is present as calcium halide which is readily dissolved by a water washing of the activated composition.

It has been discovered that only when the halogen is incorporated in a gram-atom amount at least equal to and up to about ten times greater than the lead does the composition exhibit the intense, narrow band ultraviolet emission desired.

Each of the halogens, chlorine, bromine, and iodine can be utilized in this composition, but chlorine yields the most efficient phosphor.

The halogen is preferably supplied in excess in the raw mix over the amount desired to be incorporated to facilitate the incorporation and also promote crystal growth. In general it has been found preferable to provide a halogen content in the raw mix of about $10^{-2}$ gram-atom per gram-ratio of sulfur in order to incorporate about $10^{-3}$ gram-ratio of halogen per mol of sulphide in the final composition.

While the halogen has been described as being added to the raw mix as calcium halide, it may also be added as ammonium halide, or even by including a high halogen content in the firing atmosphere.

It has also been discovered that the ultraviolet emission is adversely affected by the inclusion of an alkali metal. When alkali metal is included in the raw mix in amounts which are of the same order of magnitude as the amount of halide, there is essentially no ultraviolet emission. Thus it, for example, the raw mix has a molar ratio of alkali metal to halide of 0.1 oil or greater, there is no discernable ultraviolet emission. For maximum development of the ultraviolet emission, the phosphor should be substantially free of alkali metal.

Figure 2:
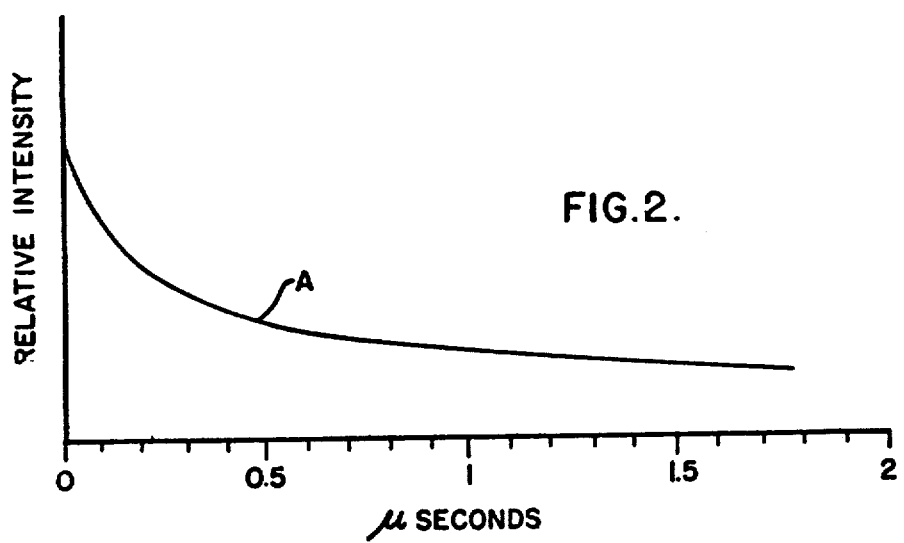
FIG. 2 is a plot of the decay of relative emission intensity against time for the phosphor of the present invention after excitation by an electron beam pulse of 10 kilovolts and approximately a 10 microamp per square centimeter current density.

It can be readily seen from FIG. 2 that a typical emission decay for the phosphor of the present invention to a value of one-third, or about 37 percent, of the initial intensity takes about 0.6 microsecond. This decay time is not as fast as the decay time for the P-16 phosphor but it compares favorably and thus suggests the use of the phosphor of the present invention in flying spot scanners and other cathode-ray applications. The phosphor of the present invention exhibits a greater stability and burn resistance to intense electron beams than the P-16 phosphor.

I claim as my invention:

1. A luminescent composition which has an emission substantially confined to the ultraviolet range of 300–400 NM which composition is substantially free from alkali metal, said composition consisting essentially of CaS:Pb, X, wherein Pb is present in an activating proportion of from about $10^{-5}$ to $10^{-3}$ gram-atom per mol of sulfide, and X is at least one of the halogens, chlorine, bromine or iodine in a gram-atom amount which is at least equal to and up to about ten times greater than the Pb gram-atom content.

2. The composition specified in claim 1, wherein said halogen is present in a gram-atom amount of about ten times the Pb garm-atom gram-atom 3. The composition specified in claim 1, wherein said Pb is present in an amount of about $10^{-4}$ gram-atom per mol of sulfide.

4. The composition specified in claim 1, wherein said halogen is chlorine.

* * * * *